United States Patent
Jhang et al.

(10) Patent No.: US 8,825,553 B2
(45) Date of Patent: Sep. 2, 2014

(54) SECURE CUSTOMER ACKNOWLEDGEMENT OF RELAY ACTUATION

(75) Inventors: Hyoung Jhang, Johns Creek, GA (US); Vernon Meadows, Lilburn, GA (US); Kamal Kumar Arvind, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 429 days.

(21) Appl. No.: 13/329,919

(22) Filed: Dec. 19, 2011

(65) Prior Publication Data

US 2013/0154793 A1    Jun. 20, 2013

(51) Int. Cl.
*G06Q 20/00* (2012.01)

(52) U.S. Cl.
USPC .......... 705/63; 705/50; 379/106.03; 380/247; 380/255; 380/258; 380/277; 702/62; 340/3.1; 340/4.3; 340/870.02; 340/5.1; 340/539.1; 340/539.11; 340/539.13; 340/539.14; 340/539.23

(58) Field of Classification Search
CPC ......... G01D 4/00; G01D 4/002; G01D 4/004; G01D 4/006; G01D 4/008; G01D 4/02; Y04S 10/10; Y04S 10/18; Y04S 10/26; Y04S 10/50; Y04S 20/00; Y04S 20/10; Y04S 20/20; Y04S 20/221; Y04S 20/24; Y04S 20/30; Y04S 20/32; Y04S 20/322; Y04S 20/325; Y04S 20/327; Y04S 20/36; G06Q 50/06; G06Q 2220/00; G06Q 2220/10; G06Q 2220/12; H04W 4/04; H04W 4/021; H04W 4/023; H04W 4/025
USPC ......... 705/50, 63; 340/500, 539.1, 0.11, 0.13, 340/0.14, 0.23, 686.1, 686.6, 3.1, 4.3–4.36, 340/5.1, 870.02; 380/247–250, 270, 255, 380/258, 277–286; 702/62; 379/106.03
See application file for complete search history.

(56) References Cited

U.S. PATENT DOCUMENTS

| | | | | |
|---|---|---|---|---|
| 6,950,017 | B2 * | 9/2005 | Smith | 340/521 |
| 7,216,108 | B2 * | 5/2007 | Hastings et al. | 705/63 |
| 7,561,681 | B2 * | 7/2009 | Booth et al. | 379/106.03 |
| 7,747,534 | B2 * | 6/2010 | Villicana et al. | 705/63 |
| 8,181,262 | B2 * | 5/2012 | Cooper et al. | 726/28 |
| 8,583,915 | B1 * | 11/2013 | Huang | 713/155 |
| 2005/0033701 | A1 * | 2/2005 | Challener et al. | 705/63 |
| 2009/0125351 | A1 * | 5/2009 | Davis et al. | 705/7 |
| 2012/0326836 | A1 * | 12/2012 | Sewell et al. | 340/4.34 |

* cited by examiner

*Primary Examiner* — Steven Lim
*Assistant Examiner* — Ryan Sherwin
(74) *Attorney, Agent, or Firm* — Fletcher Yoder, P.C.

(57) ABSTRACT

A request for an acknowledgement using a private key may be generated and transmitting to a customer device. The acknowledgement may be received from the customer device and verified using a public key associated with a customer operating the customer device. A request for a current location of the customer device may be transmitted and the current location may be received. A determination that the current location is proximate to a meter may be made, and, in response to determining that the current location is proximate to the meter, the meter may be manipulated.

20 Claims, 4 Drawing Sheets

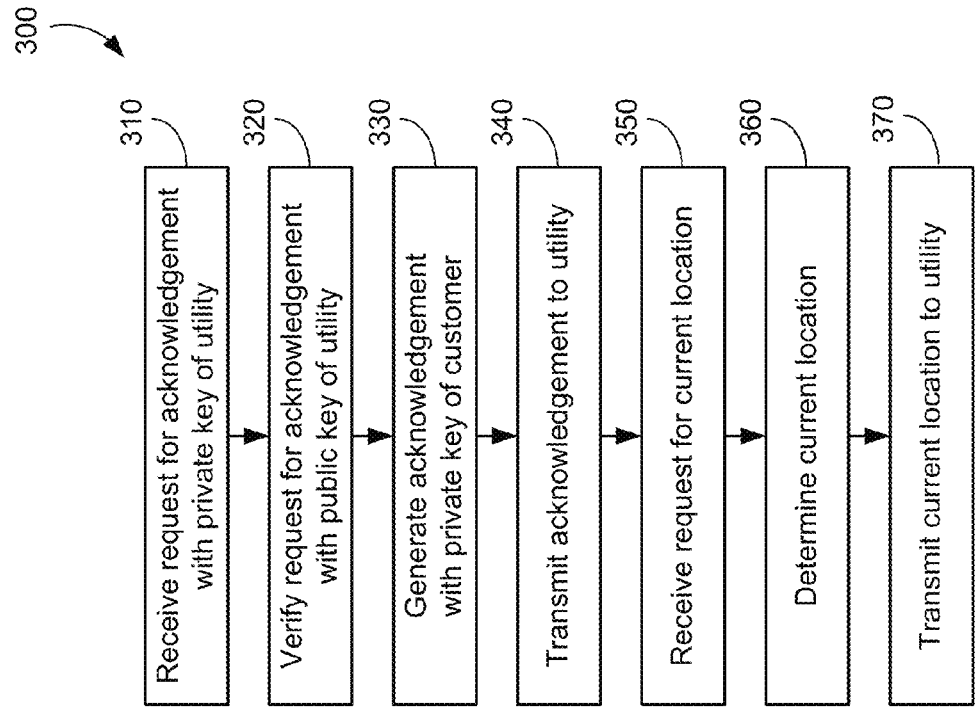
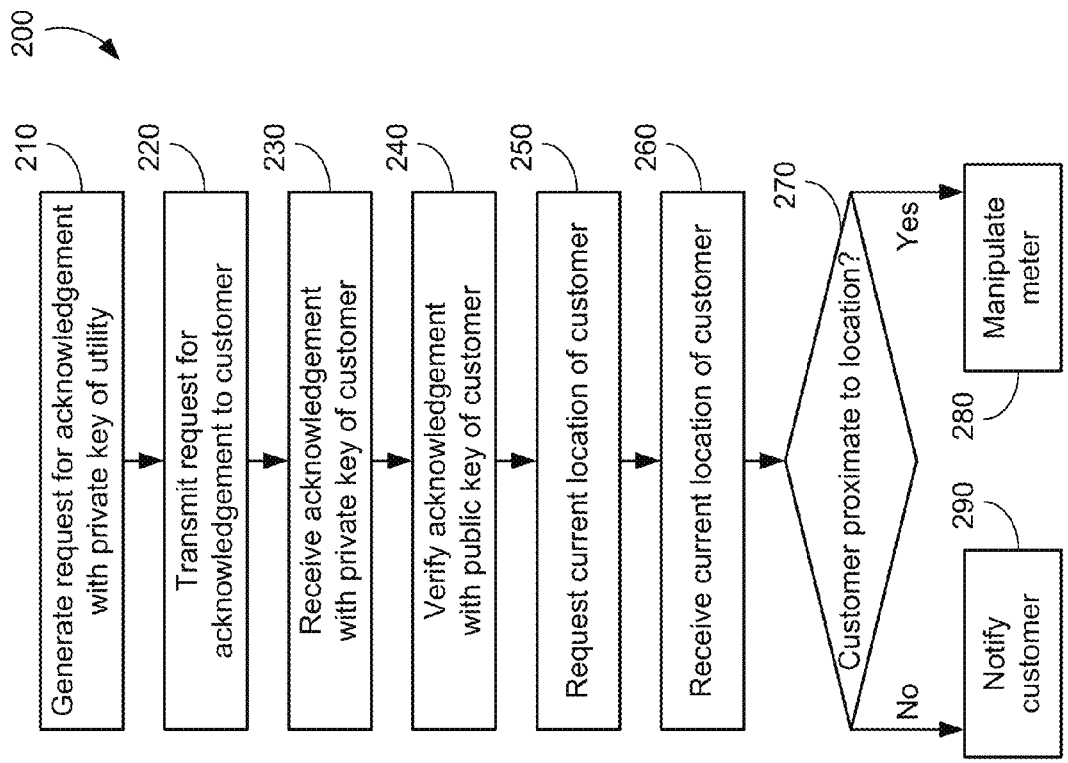

US 8,825,553 B2

SECURE CUSTOMER ACKNOWLEDGEMENT OF RELAY ACTUATION

TECHNICAL FIELD

The present disclosure relates to electrical supply actuation and in particular to providing and obtaining secure customer acknowledgement of presence at a location where an electrical supply is to be manipulated.

BACKGROUND

Electricity meters have evolved from electromechanical devices, many types of which have been used since electricity became widely available and still common today, to intelligent and remotely accessible devices that are becoming more and more common. Modern electricity meters allow remote readings of electricity usage and remote control of other functions. Among these functions, a modern electricity meter may allow remote connection and disconnection from the power network. This allows a utility to remotely start or stop providing electricity to a location with such a meter, preventing the need to send a technician to the location to actuate the relay that severs or restores a connection to the power network. However, it is often desired that a person be at the site at which power is to be provided to confirm that the electricity has been activated at the site and ensure that nothing adverse has occurred once the power was turned on. Since these tasks do not typically require special skills, they are often performed by a customer at the site (e.g., a homeowner, tenant, landlord, etc.). In performing remote activation or deactivation of electricity, a utility may want to determine whether the person confirming to them that the power is activated is actually at the site.

BRIEF DESCRIPTION OF THE INVENTION

According to one embodiment of the invention, a request for an acknowledgement using a private key may be generated and transmitted to a customer device. An acknowledgement may be received from the customer device and may be verified using a public key associated with a customer operating the customer device. A request may be transmitted for a current location of the customer device and the current location may be received. A determination may be made that the current location is proximate to a meter, and, in response to determining that the current location is proximate to the meter, the meter may be manipulated.

According to another embodiment of the invention, a system may be implemented that generate a request for an acknowledgement using a private key and transmit the request to a customer device. The acknowledgement from the customer device may be received and verified using a public key associated with a customer operating the customer device. A request for a current location of the customer device may be transmitted and the current location may be received. A determination may be made as to whether the current location is proximate to a meter, and, in response, the meter may be manipulated.

According to another embodiment of the invention, a computer-readable medium may comprise computer-executable instructions for generating a request for an acknowledgement using a private key, transmitting the request to a customer device, and receiving the acknowledgement from the customer device. Further instructions for verifying the acknowledgement using a public key associated with a customer operating the customer device, transmitting a request for a current location of the customer device, and receiving the current location may be configured on the computer-readable medium. Further instructions for determining that the current location is proximate to a meter and, in response to determining that the current location is proximate to the meter, manipulating the meter may be configured on the computer-readable medium.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein:

FIG. 2 is a non-limiting example method of performing an embodiment of the present disclosure.

FIG. 3 is another non-limiting example method of performing an embodiment of the present disclosure.

DETAILED DESCRIPTION OF THE INVENTION

Figure 1:
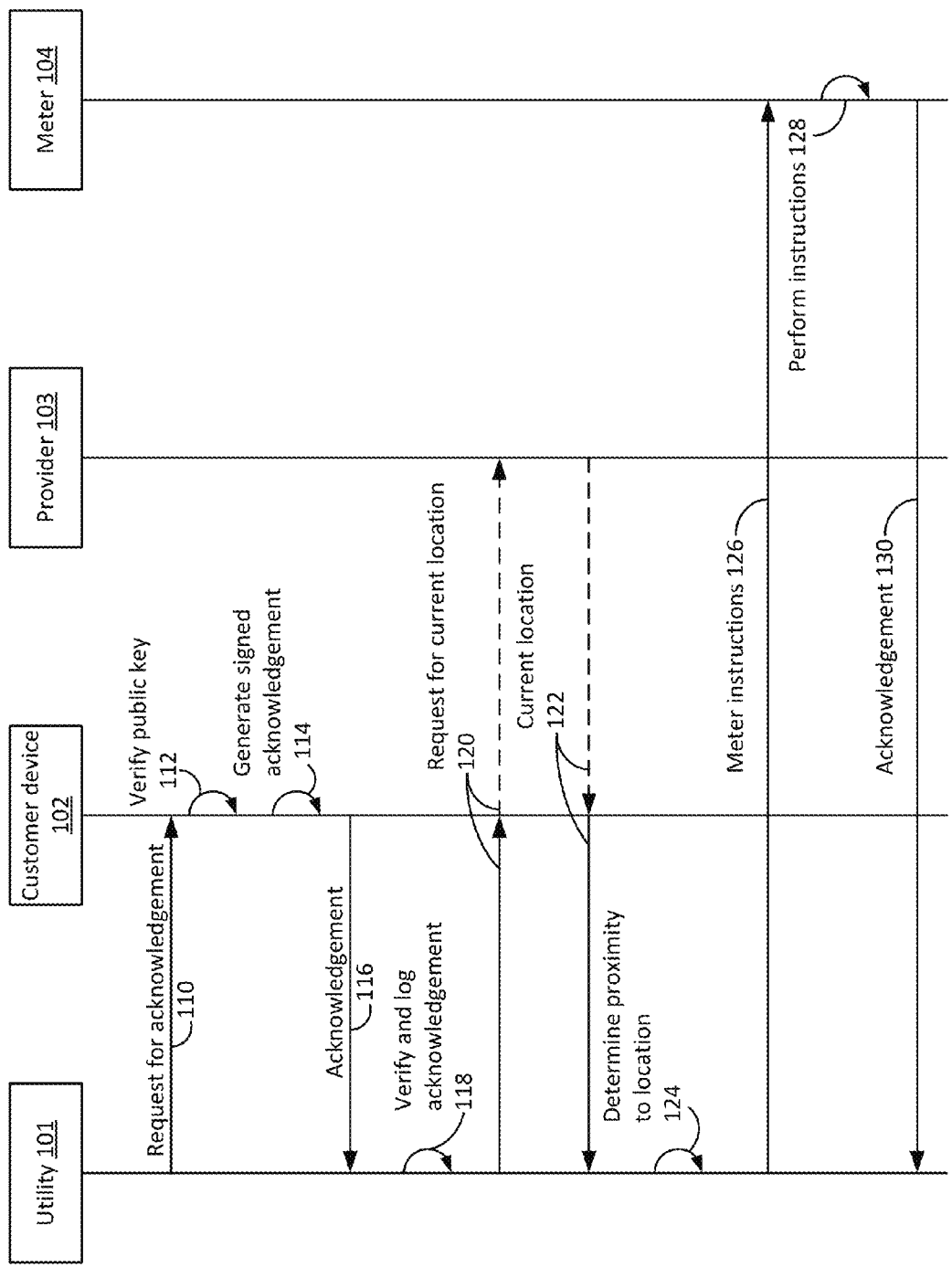
FIG. 1 is a non-limiting example signal flow according to one embodiment of the present disclosure.

In order to ensure that a utility (e.g., a provider of electricity) is remotely manipulating components at the correct site, the utility may request confirmation from someone at the site. For example, when turning on the power at a residence, the utility may ask a customer to be present at the residence to confirm that the utility is communicating with one or more devices at the residence that may be used to connect or disconnect the residence from the supply of electricity. The utility may ask the customer to confirm that communication with the device is established, for example by acknowledging that an indication presented by the device indicates successful communication between the device and the utility. The utility may also ask the customer to confirm that the power has been turned on or off and/or confirm any other status that the customer may be able to ascertain.

In an embodiment, a utility may send a signal to a device, such as an electricity meter, that causes the device to generate an indicator detectable by a human observer. The utility may confer with a person on the site and confirm that the person sees or otherwise can detect the indicator. This lets the utility confirm that the utility is communicating with the correct device. Upon confirmation, the utility may then instruct the device to activate, deactivate, connect, disconnect, etc., electrical service to the site. For example, the utility may send an actuation command to a remote connect/disconnect switch in a meter to control the switch and turn on or shut off power to the site serviced by the meter. The utility and the person at the site may communicate via telephone or data communications to confirm that the utility is communicating with the correct device.

There are several issues that may need to be addressed when confirming with a person on-site that a utility is communicating with the correct meter. The utility may need to ensure that the person supposedly at the site is actually the person that they believe is at the site (i.e., is actually the customer or person approved to provide confirmation to the utility). This may include ensuring that the communications between the person at the site and the utility are authentic and secure. The utility may also need to ensure that the person supposedly at the site is actually at the site. This may include determining an actual location of the person at the site and comparing that location to the site location. The utility may also want to make the confirmation process is as simple, convenient, and brief as possible in order to reduce any hardship or inconvenience for the person at the site, who may be a customer of the utility, for example.

Note that various devices and combinations of devices that may be configured to activate and/or deactivate electrical service, provide indications of various types, assist in confirmations, and perform any other activities or functions described herein may be used in the embodiments set forth herein, and all such devices are intended to be encompassed by the term "meter" as used herein, regardless of whether the described device performs the functions typically associated with electricity meters. Note also that any person at a site that may assist a utility or any other entity in providing confirmations and performing any other tasks as described herein, including those In some embodiments, a button may be configured on a meter that allows a customer to confirm that a utility is communicating with the meter by actuating the button. This ensures that the customer is actually at the site, but requires the customer to access the meter which may be inconvenient and it may also be difficult to alert that customer that such a button needs to be actuated. Moreover, the utility may not be able to determine that the person pressing the button on the meter is actually the customer or person who is authorized to provide confirmation.

In other embodiments, a request for confirmation from a customer may be sent to a device operated by a customer, such as a smart phone. Such a request may include a bar code or other machine-readable content that may then be scanned or otherwise detected by an appropriately configured meter. This method of confirmation may still be inconvenient since it requires the customer to go to the meter for confirmation, and in this case, the utility cannot be assured that the person providing the bar code or other data to the meter is the customer.

In an embodiment that may increase convenience and security, a pair of keys that include a public key and a private key may be used to authenticate a customer and/or a utility. FIG. 1 provides an illustrative example of a message flow that may be implemented according to such an embodiment. In FIG. 1, utility 101 may interact with customer device 102, which may be a mobile device such as a smart phone operated by a customer of utility 101. Provider 103 may be any type of network or combinations of networks operated by any one or more entities that may provide wireless and/or wired connectivity to customer device 102 and utility 101, as well as to meter 104. Meter 104 may be an intelligent electricity meter and/or any other type of device or combination of devices that may be used in any embodiment disclosed herein.

At 110, a request for acknowledgement may be sent from utility 101 to customer device 102 requesting acknowledgement. This acknowledgement request may ask customer device 102 to acknowledge that customer device 102 is at the site at which the utility is attempting to control (e.g., connect, disconnect, activate, deactivate, etc.) the supply of electricity. The request for acknowledgement may instead, or in addition, serve to acknowledge that customer device 102 is the customer with which utility 101 is intending to communicate. The request for acknowledgement may be signed, or otherwise include or be accompanied by, a private key configured, owned, or otherwise associated with utility 101. The request for acknowledgement may also, or instead, be encrypted by a private key of utility 101 and may be readable only upon application of a public key of utility 101.

Customer device 102 may verify utility 101's private key at 112. This may be accomplished using any means, manual or automatic. For example, customer device 102 (e.g., a smart phone, computing device, or other device operated by the customer that received the message) may obtain utility 101's public key and use it to verify that the request for acknowledgement is from or otherwise associated with utility 101. Alternatively, customer device 102 may decrypt the request for acknowledgement using utility 101's public key, thereby confirming that the request for acknowledgement is from or associated with utility 101.

The customer operating customer device 102 may be provided with the public key of utility 101 in advance, for example directly or indirectly by utility 101, or the customer may obtain utility 101's public key, for example from a service or device that is configured to provide utility 101's public key. In an embodiment, after obtaining utility 101's public key, customer device 102 may store utility 101's public key so that future communications with utility 101 may be verified without using resources (e.g., cellular communications resources, wireless data plan minutes or bandwidth, etc.) to obtain utility 101's public key again.

Upon verifying that the request for acknowledgement is from utility 101, customer device 102 may generate an acknowledgement at 114. The acknowledgement may be signed, encrypted, or otherwise associated with a private key of the customer operating customer device 102 using any means as set forth herein or any other means. The acknowledgement may be transmitted to utility 101 at 116.

Utility 101 may verify the private key of the customer operating customer device 102 at 118. This may be accomplished using any means, manual or automatic. For example, utility 101 (e.g., computing device, server, or other device operated by utility 101 that received the message) may obtain the customer's public key and use it to verify that the acknowledgement is from or otherwise associated with the customer. Alternatively, utility 101 may decrypt the acknowledgement using the customer's public key, thereby confirming that the acknowledgement is from or associated with the customer operating customer device 102.

Utility 101 may be provided with the public key of the customer operating customer device 102 in advance, for example directly or indirectly by the customer operating customer device 102, or utility 101 may obtain the customer's public key, for example from a service or device that is configured to provide customer 102's public key. In an embodiment, after obtaining the customer's public key, utility 101 may store the customer's public key so that future communications with the customer may be verified without using resources to obtain the customer's public key again. At 118, utility 101 may also log the receipt and/or verification of the acknowledgement from customer device 102 received at 116. This log may be useful for later verifying the contact with customer 102.

At 120, utility 101 may transmit a request for the customer device 102's current location. In an embodiment, the request may be transmitted to customer device 102 that may then determine or obtain customer device 102's own location using global positioning system (GPS) components configured on, and/or GPS data stored at, customer device 102 (e.g., GPS components and/or data in a smart phone or computing device associated with the customer). Alternatively, customer device 102 may query its telecommunications provider for its location data. Note that in some embodiments, a location request may such as that transmitted at 110 may be combined with an acknowledgement request such as that at 110. The current location provided at 122 may also, or instead, be provided with an acknowledgement such as that provided at 116. Any other combinations of locations, acknowledgements, and requests therefor, are contemplated as within the scope of the present disclosure.

In another embodiment, at 120 utility 101 may transmit a request for customer device 102's current location to provider 103 that may be providing communications services to customer device 102. Provider 103 may obtain, from existing records or as the result of a determination initiated by the request received at 120, a current location for customer device 102.

At 122, the current location of customer device 102 may be transmitted to utility 101. At 124, utility 101 may determine whether customer device 102 is proximate to or at the location at which utility 101 is attempting to control the electricity. Utility 101 may determine that a customer should be no more than a threshold distance from a location or from a meter at a location before utility 101 attempts to manipulate a meter at that location. The threshold distance may be predetermined or determined as needed. The threshold distance may be consistent across all locations serviced by utility 101, or may vary depending on circumstances (e.g., distance may be shorter for residential locations and longer for commercial locations). Any distance and any means of setting a threshold distance and/or determining whether a customer is within a threshold distance are contemplated as within the scope of the present disclosure.

Note that in an embodiment, utility 101 may periodically or continually request and receive a current location of customer device 102. This may enable utility 101 to detect if customer device 102 travels farther than the threshold distance from the location. If this happens, utility 101 may cease interacting with meter 104 at the location because utility 101 may determine that the customer is no longer proximate enough to the location to proceed with manipulation of the meter. Utility 101 may cease monitoring the current location of customer device 102 upon completion of the tasks to be performed at the location of meter 104.

Upon determining at 124 that customer device 102 is proximate to the location at which utility 101 is attempting to control the electricity, at 126 utility 101 may transmit instructions, commands, or otherwise control meter 104 at the location. Such instructions and/or commands may include any instructions, commands, or any other means of controlling meter 104 or causing meter 104 to perform any actions and/or functions. Meter 104 may perform such actions and/or functions at 128. Meter 104 may transmit an acknowledgement to utility 101 that such actions and/or functions have been performed. Alternatively, or instead, meter 104 may transmit an acknowledgement of receipt of such instructions and/or commands to utility 101 at 130. Note that the activities of 126, 128, and/or 103 may be repeated as desired to perform the functions that utility 101 desires to accomplish at the location associated with meter 104.

FIG. 2 illustrates example method 200 of implementing an embodiment of the present disclosure that may be performed by a utility. At block 210, a utility may generate a request for acknowledgment from a customer and may sign, encrypt, or otherwise associate the request with a private key associated with the utility. At block, 220, the utility may transmit the request for acknowledgement to the customer (e.g., to a customer device). At block 230, the utility may receive the requested acknowledgement from the customer that may be signed with, encrypted by, or otherwise be associated with a private key of the customer. At block 240, the utility may verify the received acknowledgement using a public key associated with the customer.

At block 250, the utility may request a current location of the customer. This request may be directly or indirectly sent to either a customer device or to a provider that provides communications services to the customer device. Note that this request may also be included in or sent with the request for acknowledgment of block 210. At block 260, the utility may receive a current location of the customer. The current location may be directly or indirectly received from either the customer device or from a provider that provides communications services to the customer device. Note that this location may also be included in or sent with the acknowledgment of block 230.

At block 270, the utility may determine whether the current location of the customer is sufficiently proximate to the location at which the utility is attempting to control the electricity. If so, at block 280, the utility may manipulate the meter at the location to activate, deactivate, turn on or off, or otherwise control the electricity. If the customer is not sufficiently proximate to the location, at block 290, the utility may send a notification to the customer that the utility is unable to manipulate the electricity at the location due to the customer's insufficient proximity to the location.

FIG. 3 illustrates example method 300 of implementing an embodiment of the present disclosure that may be performed by a customer device or a device otherwise operated by a customer. At block 310, a customer device may receive a request for acknowledgment from a utility that may be signed, encrypted, or otherwise accompanied by a private key associated with the utility. At block, 320, the customer device may verify the request for acknowledgement using a public key associated with the utility.

At block 330, the customer device may generate an acknowledgment and may sign, encrypt, or otherwise associate the acknowledgement with a private key associated with the customer. At block, 340, the customer device may transmit the acknowledgement to the utility.

At block 350, the customer device may receive a request for a current location of the customer from the utility. Note that this request may also be included in or sent with the request for acknowledgment of block 310. Note also that in alternate embodiments a utility may not send such a request for a current location to a customer device but rather may send such requests to a communications provider. At block 360, the customer device may determine a current location of the customer device, from local components and/or data (e.g., GPS components and/or data) and/or by interacting with a network that provides services to the customer device. At block 370, the customer device may transmit the current location to the utility.

Note that the activities of method 300 and any other embodiments set forth herein may be enabled on a device using an application designed for a smart phone (i.e., an "app"). In some embodiments, a customer may register, for example via a web site, with a utility to perform the embodiment disclosed herein. Such registration may include the assignment, notification, and/or provision of public and private key pairs. Note that although references may be made herein to smart phones, wireless communications devices, and similar devices, embodiments disclosed herein may also be performed using laptop and desktop computers, traditional telephones, Internet protocol (IP) phones, and any device that is capable of performing any part of any embodiment set forth herein. Note also that while the present specification uses electrical power in describing example embodiments, any type of service or utility may be controlled using the embodiments described herein, such as natural gas, cable television, data services, Internet services, etc.

Figure 4:
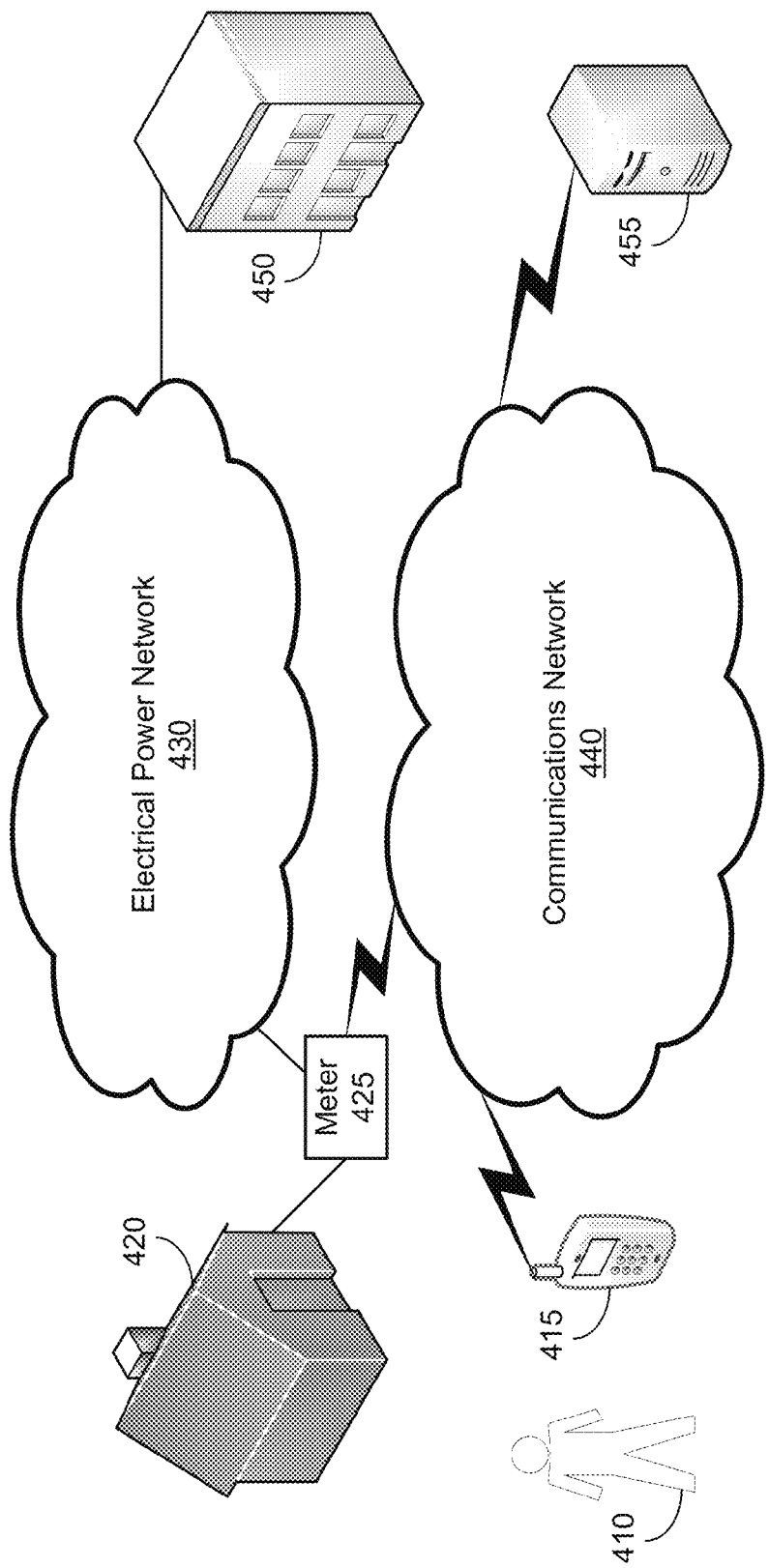
FIG. 4 is a block diagram of a non-limiting example device and network configuration according to one embodiment of the present disclosure.

FIG. 4 illustrates an example configuration that may be used to implement embodiments disclosed herein. FIG. 4 is a simplified diagram provided for illustrative purposes only, and all devices and networks described in FIG. 4 may be implemented using any devices, components, and any combination thereof.

Customer 410 may be a customer of utility 450. Customer 410 and/or utility 450 may desire that the electrical power at location 420 be manipulated in some fashion. Customer 410 may operate wireless communications device 415 in order to interact with utility 450 as disclosed herein. Utility 450 may operate computing device 455 to facilitate such interaction. Devices 415 and 455 may communicate via communications network 440 that may be any type of wired or wireless communications network, or a combination thereof, that may support any type of communications, including voice and/or data communications.

Location 420 may be configured with meter 425 that may control and/or manipulate the supply of electricity provided to location 420. The supply of electricity to location 420 via meter 425 may be provided by electrical power network 430, which may be any type of electrical power network or grid, and any combination thereof. Utility 450 may communicate with meter 425 via electrical power network 430, communications network 440, or both.

Figure 5:
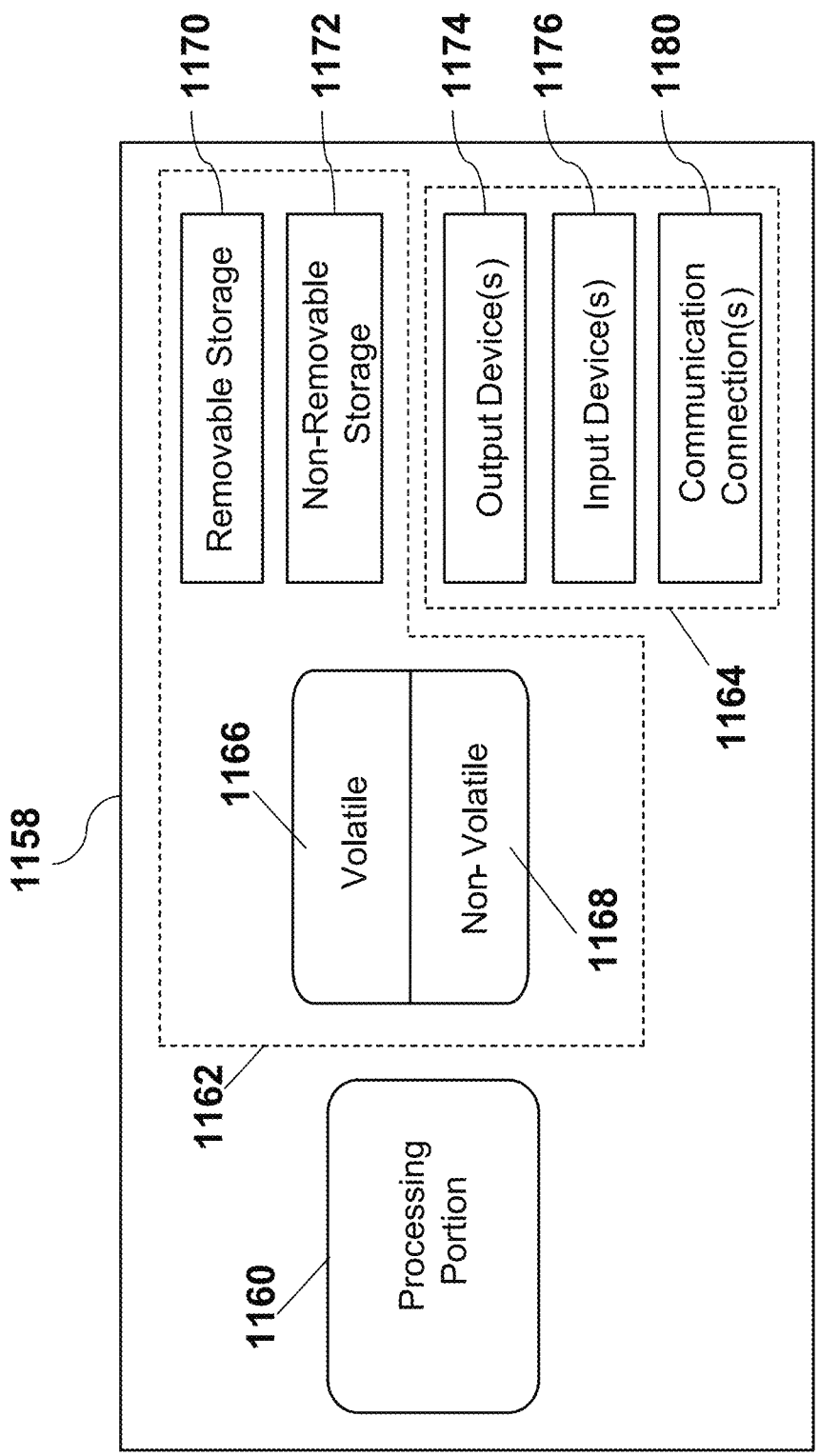
FIG. 5 is a block diagram of a non-limiting exemplary processor in which embodiments of the present disclosure may be implemented.

FIG. 5 is a block diagram of an example processor 1158 that may be employed providing the technical effect of any of the embodiments described herein. Processor 1158 may be used as a component of any embodiment disclosed herein, including as one or more components of a meter, communications device, network, server, and computing device as disclosed herein, and/or as one or more components of any related equipment, system, or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 5, the processor 1158 comprises a processing portion 1160, a memory portion 1162, and an input/output portion 1164. Input/output portion 1164 may also be referred to generally as a transceiver. The processing portion 1160, memory portion 1162, and input/output portion 1164 are coupled together (coupling not shown in FIG. 5) to allow communications between these portions. The processing portion 1160 executes instructions that may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, for example, from a memory, a computer-readable medium, etc., and executes these instructions, thereby performing one or more processes, including one or more of the processes described herein. Such instructions and other data may be stored and transmitted using a variety of known computer-readable media. The input/output portion 1164 is capable of transmitting, providing and/or receiving components, commands, and/or instructions, utilized to, for example, provide instructions, acknowledgements, and requests for acknowledgement to one or more meters, networks, wireless devices, servers, etc., and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with determining contact points, determining contact point coordinates, determining whether additional material should be removed from an object, etc. For example, the memory portion is capable of schematics, mappings, etc. Depending upon the exact configuration and type of processor, the memory portion 1162 may be volatile (such as RAM) 1166, non-volatile (such as ROM, flash memory, etc.) 1168, or a combination thereof. The processor 1158 may have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other tangible medium that may be used to store the desired information and that may be accessed by the processor 1158. Any such computer storage media may be part of the processor 1158.

The processor 1158 may also comprise the communications connection(s) 1180 that allow the processor 1158 to communicate with other devices, for example through any type of wired or wireless communications means. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared, cellular, and other wireless media. The term computer-readable media as used herein may include both storage media and communication media. The processor 1158 may have input device(s) 1176 such as keyboard, keypad, mouse, pen, voice input device, touch input device, etc. Output device(s) 1174 such as a display, speakers, printer, etc. also can be included.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   generating a request for an acknowledgement using a private key;
   transmitting the request to a customer device;
   receiving the acknowledgement from the customer device;
   verifying the acknowledgement using a public key associated with a customer operating the customer device;
   transmitting a first request for a current location of the customer device;
   receiving the current location;
   determining that the current location is proximate to a meter;
   in response to determining that the current location is proximate to the meter, manipulating the meter.

2. The method of claim 1, wherein determining that the current location is proximate to the meter comprises determining that the current location is within a threshold distance from the meter.

3. The method of claim 1, wherein manipulating the meter comprises at least one of activating electrical power at a location associated with the meter and deactivating electrical power at a location associated with the meter.

4. The method of claim 1, wherein manipulating the meter comprises transmitting a command to the meter via a communications network.

5. The method of claim 4, further comprising receiving an acknowledgement of receipt of the command from the meter via the communications network.

6. The method of claim 1, further comprising transmitting a second request for a second current location of the customer device.

7. The method of claim 6, further comprising receiving the second current location and determining whether the second current location is proximate to a meter.

8. A system comprising:
   a memory;
   a processor in communication with the memory, the processor configured to:
      generate a request for an acknowledgement using a private key;
      verify the acknowledgement using a public key associated with a customer operating a customer device;
      generate a request for a current location of the customer device;
      determine that the current location is proximate to a meter; and
      in response to determining that the current location is proximate to the meter, manipulate the meter; and
   a transceiver in communication with the processor, the transceiver configured to:
      transmit the request for an acknowledgement to the customer device;
      receive the acknowledgement from the customer device;
      transmit the request for the current location of the customer device; and
      receive the current location.

9. The system of claim 8, wherein the customer device is a wireless communications device.

10. The system of claim 8, wherein the transceiver is further configured to transmit a command to manipulate the meter via a wireless communications network.

11. The system of claim 10, wherein the command comprises at least one of a command to activate electrical power at a location associated with the meter and a command to deactivate electrical power at the location associated with the meter.

12. The system of claim 8, wherein the processor is further configured to:
    determine that the current location is not proximate to the meter; and
    in response, generate a notification for transmission to the customer device.

13. The system of claim 8, wherein the transceiver is further configured to receive an acknowledgement of receipt of a command to manipulate the meter transmitted to the meter by the transceiver.

14. The system of claim 8, wherein the processor is further configured to:
    determine that a second current location is not proximate to the meter; and
    in response, cease manipulation of the meter.

15. A non-transitory computer-readable medium comprising computer-executable instructions for:
    generating a request for an acknowledgement using a private key;
    transmitting the request to a customer device;
    receiving the acknowledgement from the customer device;
    verifying the acknowledgement using a public key associated with a customer operating the customer device;
    transmitting a first request for a current location of the customer device;
    receiving the current location;
    determining that the current location is proximate to a meter;
    in response to determining that the current location is proximate to the meter, manipulating the meter.

16. The non-transitory computer-readable medium of claim 15, wherein instructions for determining that the current location is proximate to the meter comprise instructions for determining that the current location is within a threshold distance from the meter.

17. The non-transitory computer-readable medium of claim 15, wherein instructions for manipulating the meter comprise at least one of activating electrical power at a location associated with the meter and deactivating electrical power at a location associated with the meter.

18. The non-transitory computer-readable medium of claim 15, wherein instructions for manipulating the meter comprise instructions for transmitting a command to the meter via a communications network.

19. The non-transitory computer-readable medium of claim 18, further comprising instructions for receiving an acknowledgement of receipt of the command from the meter via the communications network.

20. The non-transitory computer-readable medium of claim 1, further comprising instructions for transmitting a second request for a second current location of the customer device.

* * * * *